US012810656B2

(12) United States Patent
Kunieda et al.

(10) Patent No.: US 12,810,656 B2
(45) Date of Patent: Nov. 24, 2026

(54) VEHICLE SYSTEM

(71) Applicant: DENSO CORPORATION, Kariya-city (JP)

(72) Inventors: Hiroyoshi Kunieda, Kariya-city (JP); Hiroki Hayashi, Kariya-city (JP); Akira Tanimoto, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 177 days.

(21) Appl. No.: 18/485,310

(22) Filed: Oct. 11, 2023

(65) Prior Publication Data

US 2024/0038000 A1 Feb. 1, 2024

Related U.S. Application Data

(63) Continuation of application No. PCT/JP2022/014476, filed on Mar. 25, 2022.

(30) Foreign Application Priority Data

Apr. 15, 2021 (JP) ................................ 2021-069094

(51) Int. Cl.

| | |
|---|---|
| ***G07C 5/00*** | (2006.01) |
| ***B60R 11/02*** | (2006.01) |
| ***B60R 16/023*** | (2006.01) |
| ***B60R 16/037*** | (2006.01) |

(52) U.S. Cl.

CPC .................................... *G07C 5/008* (2013.01)

(58) Field of Classification Search

CPC ....... G07C 5/008; B60R 11/02; B60R 16/023; B60R 16/037

USPC ........................................................ 701/31.4

See application file for complete search history.

(56) References Cited

U.S. PATENT DOCUMENTS

| | | | | |
|---|---|---|---|---|
| 9,946,531 | B1 * | 4/2018 | Fields | G06F 8/65 |
| 2010/0088029 | A1 | 4/2010 | Hu et al. | |
| 2010/0115505 | A1 | 5/2010 | Touati et al. | |
| 2013/0124009 | A1 * | 5/2013 | Esler | B60W 50/085 701/1 |
| 2015/0105976 | A1 * | 4/2015 | Shikii | G06F 3/04817 701/36 |
| 2016/0090055 | A1 * | 3/2016 | Breed | G06F 3/0219 701/2 |
| 2018/0011772 | A1 * | 1/2018 | Meyer | G06F 13/385 |
| 2018/0239896 | A1 | 8/2018 | Kato et al. | |
| 2021/0173629 | A1 * | 6/2021 | Dejean | G06F 1/3265 |
| 2024/0037999 | A1 | 2/2024 | Kunieda et al. | |

FOREIGN PATENT DOCUMENTS

| | | | |
|---|---|---|---|
| JP | 2006129064 | A | 5/2006 |
| JP | 2010522335 | A | 7/2010 |
| JP | 2014222245 | A | 11/2014 |
| JP | 6130617 | B1 | 5/2017 |

* cited by examiner

*Primary Examiner* — Tyler D Paige

(74) *Attorney, Agent, or Firm* — Harness, Dickey & Pierce, P.L.C.

(57) ABSTRACT

A vehicle system of an embodiment includes a vehicular device and an external device solely operable and is communicably connected to the vehicular device. The external device is accessible from an external terminal device, and reflects a result of an access therefrom on the vehicular device.

8 Claims, 11 Drawing Sheets

VEHICLE SYSTEM

CROSS REFERENCE TO RELATED APPLICATION

This application is a continuation application of International Patent Application No. PCT/JP2022/014476 filed on Mar. 25, 2022, which designated the U.S. and claims the benefit of priority from Japanese Patent Application No. 2021-069094 filed on Apr. 15, 2021. The entire disclosure of all the above applications is incorporated herein by reference.

TECHNICAL FIELD

The present disclosure generally relates to vehicle systems utilized in vehicles.

BACKGROUND INFORMATION

In recent years, a device mounted on a vehicle, referred to as a vehicular device, stores various data such as a position and speed acquired during driving, or a travel path for navigation.

However, when the vehicle is stopped without any passengers or operators, electric power is turned off, making it impossible to make settings nor to transmit/receive data to/from the vehicular device.

SUMMARY

According to one aspect of the present disclosure, a vehicle system includes: a vehicular device; and an external device solely operable and communicatively connected to the vehicular device. The external device is configured to be accessible from an external terminal device to allow the external device to change data stored in the external device and is configured to reflect the changed data, as a result of an access from the external terminal device, on the vehicular device.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Next, a relevant technology will be described first only for understanding the following embodiments. In recent years, as shown in a relevant art, for example, there are cases where a device mounted on a vehicle is equipped with a plurality of functions. A device mounted on a vehicle is hereinafter referred to as a vehicular device.

Such a vehicular device stores various data such as a position and speed acquired during driving, or a travel path for navigation, which is implemented in the vehicular device.

However, in the vehicular device, the supply of electric power from a main power supply is turned off when the vehicle is stopped without any passengers or operators, i.e., when no occupant is onboard. Therefore, in order to make settings and to transmit/receive data to/from the vehicular device, it has been required to actually get in the vehicle and operate the vehicular device by turning on an engine key or by operating a start switch.

It is thus one objective of the present disclosure to provide a vehicle system that is capable of making settings and transmitting/receiving (i.e., delivering) data to/from a vehicular device, (a) without having an occupant onboard and (b) without starting the vehicular device on site or remotely.

In one aspect of the present disclosure, a vehicle system includes: a vehicular device; and an external device solely operable and communicatively connected to the vehicular device. The external device is configured to be accessible from an external terminal device to allow the external device to change data stored in the external device and is configured to reflect the changed data, as a result of an access from the external terminal device, on the vehicular device.

In such manner, the vehicle system is capable of making settings and transmitting/receiving, or delivering, data to/from the vehicular device (a) without having any occupant onboard, and (b) without starting the vehicular device on site or remotely.

Hereinafter, embodiments of the present disclosure will be described.

Further, the same symbols are attached to the substantially common parts over the embodiments.

First Embodiment

Figure 1:
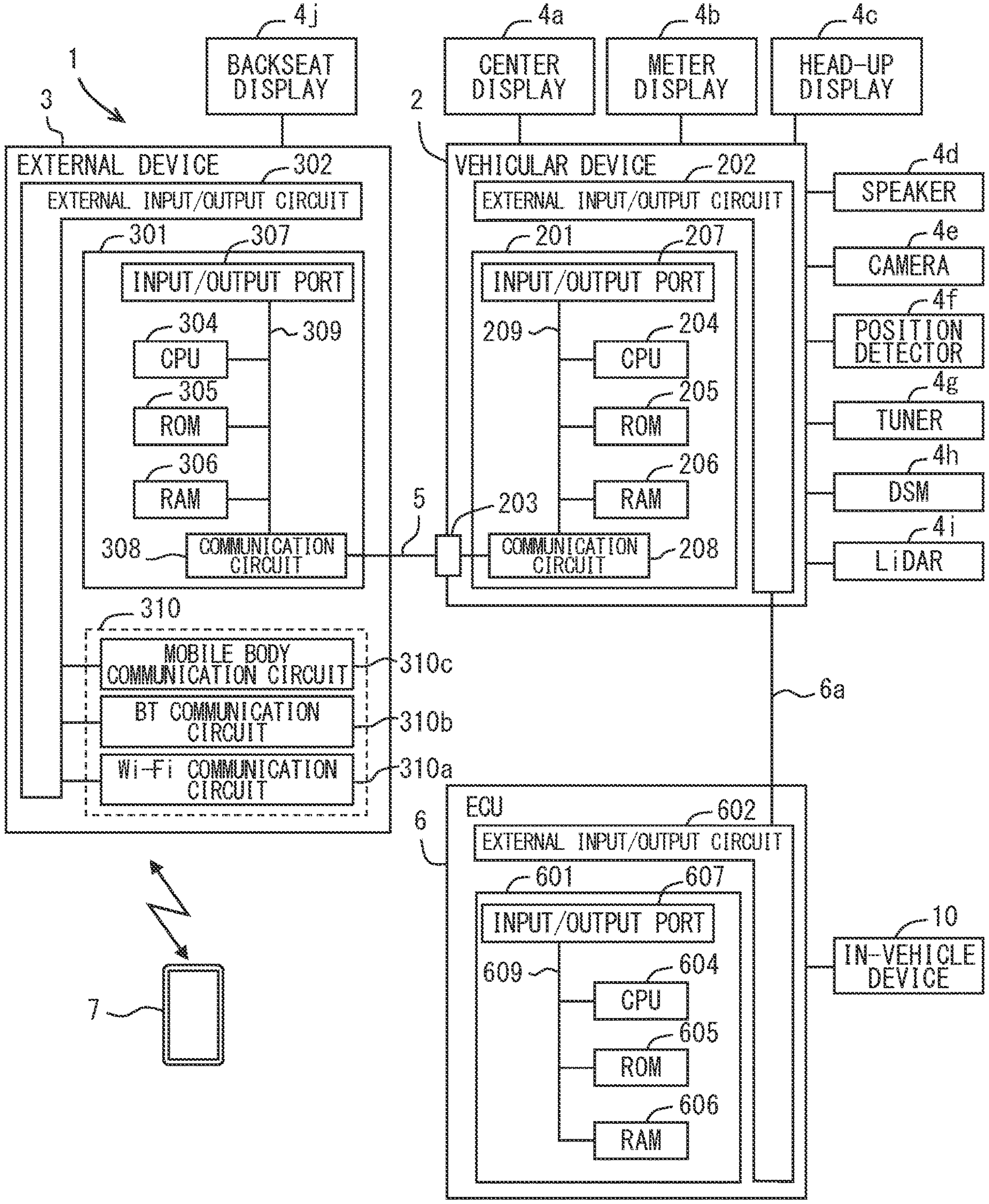
FIG. 1 is a diagram schematically showing a configuration example of a vehicle system according to a first embodiment.

The first embodiment will be described in the following. As shown in FIG. 1, a vehicle system 1 is composed of a vehicular device 2 and an external device 3. The vehicular device 2 and the external device 3 are respectively realized, for example, as a semiconductor integrated circuit configured by SoC, and are communicably connected with each other. Various peripheral devices 4 mounted on the vehicle are connected to the vehicular device 2 so that they are communicable with each other or they can be controlled by the vehicular device 2. However, although the details will be described later, FIG. 1 shows one configuration example of the vehicle system 1.

The vehicular device 2 and the external device 3 are communicably connected via a communication line 5. The vehicle system 1 is configured by the vehicular device 2 and the external device 3 operating in cooperation with each other. In the present embodiment, a USB communication path is assumed as the communication line 5, and the communication line 5 is physically composed of a USB cable. Note that USB is an abbreviation for Universal Serial Bus. However, the communication line 5 is not limited to USB, and may also be configured by wired LAN, wireless LAN, short-range wireless communication, or the like.

Further, the vehicular device 2 is communicably connected to an ECU 6, which is various electronic control units mounted on the vehicle, via an in-vehicle network 6*a*. The in-vehicle network 6*a* may be implemented as CAN, for example. ECU is an abbreviation for Electronic Control Unit, and CAN is an abbreviation for Controller Area Network. Further, although one ECU 6 is shown for the simplification of description in FIG. 1, several ECUs 6 are mounted on the vehicle. Also, the connection with the ECU 6 is not limited to CAN, and may also be configured as LIN, FlexRay, or a so-called IP network.

The vehicular device 2 includes a control unit 201 capable of performing functions provided when the vehicle is used, an external input/output circuit 202 for inputting and outputting various signals from/to the peripheral devices 4, a USB connector 203 to which the external device 3 capable of performing communication with the control unit 201 and capable of performing functions provided when using the vehicle is connected, and the like. In FIG. 1, though the external input/output circuit 202 is shown as one block for simplification of explanation, the external input/output circuit 202 may be composed of a plurality of circuits corresponding to the peripheral devices 4.

The control unit 201 includes a CPU 204, a ROM 205, a RAM 206, an input/output port 207, a communication circuit 208 and the like, which are connected by a bus 209. The CPU 204 executes programs stored in the ROM 205 to perform various processing for controlling the vehicular device 2, and provides various functions implemented therein. Note that the CPU 204 may also be configured by one or a plurality of semiconductor devices.

The ROM 205 is a non-volatile memory configured by eMMC, for example. Note that eMMC is an abbreviation for embedded Multi Media Card. The ROM 205 stores various programs to be executed by the CPU 204, data to be referred to when executing the programs, and various data such as setting information of the peripheral devices 4 and the like. Further, the ROM 205 is provided with a read-only area in which, for example, programs are stored, and a writable area in which, for example, data can be stored, and constitutes a storage unit of the vehicular device 2.

The RAM 206 is composed of volatile memory, and temporarily stores data such as calculation results and the like. Note that data temporarily stored in the RAM 206 is stored in a writable area of the ROM 205 if required. At this time, writing to the ROM 205 is performable at any timing, i.e., can be performed at the timing when the data is updated or when the vehicular device 2 is powered off.

The input/output port 207 is a circuit for inputting/outputting signals between the control unit 201 and the peripheral devices 4 or the external device 3. The communication circuit 208 corresponds to a USB system in the present embodiment, and transmits and receives data to and from the external device 3 via the communication line 5. Connection with the external device 3 is made via the USB connector 203.

The external device 3 is realized, for example, as a semiconductor integrated circuit configured by SoC, and is configured as a USB module connected to the vehicular device 2 via USB in the present embodiment. The external device 3 is communicably connected to the control unit 201 of the vehicular device 2 via the communication line 5, and, while transmitting and receiving data to and from the vehicular device 2, is capable of, via the vehicular device 2, (a) establishing access to the peripheral devices 4 and the ECU 6 and/or (b) performing data communication with the ECU 6. Further, the external device 3 can receive a supply of electric power via the communication line 5, that is, via a USB cable, from the vehicular device 2.

The external device 3 includes an external control unit 301 that performs functions implemented therein, and an external input/output circuit 302 that inputs and outputs various signals between the peripheral devices 4 and the like connected to the external device 3 itself. The external control unit 301 includes a CPU 304, a ROM 305, a RAM 306, an input/output port 307 and a communication circuit 308, which are connected by a bus 309. Although the external input/output circuit 302 is shown as one block in FIG. 1 for simplification of explanation, it may be composed of a plurality of circuits corresponding to the devices to be connected.

The CPU 304, by executing the programs stored in the ROM 305, controls the external device 3 and provides communication with the vehicular device 2 and various functions implemented therein. This CPU 304 may be composed of one or more semiconductor devices. In the present embodiment, the external control unit 301 employs the same control unit as the control unit 201 of the vehicular device 2. However, the external control unit 301 may be implemented as a device having higher processing performance than the control unit 201, or may be implemented as a device having lower processing performance than the control unit 201.

The ROM 305 stores programs executed by the CPU 304 and data referred to when the programs are executed. This ROM 305 constitutes an external storage unit provided in the external device 3. Further, the external device 3 can store data transmitted from a vehicular device 2 side, and can transmit data stored by itself to the vehicular device 2¬¬.

The input/output port 307 is a circuit for inputting/outputting signals between the external control unit 301 and other devices. In the present embodiment, as the other devices, the vehicular device 2, the peripheral devices 4 and the ECU 6 connected to the vehicular device 2, an external communication circuit 310 for communicating with an external terminal device 7 of a user and the like are assumed.

The communication circuit 308 conforms to a USB standard for communicating with the vehicular device 2 in the present embodiment. The external communication circuit 310 is configured as including a wide area network such as a Wi-Fi communication circuit 310*a* for performing communication by Wi-Fi (registered trademark), a BT communication circuit 310*b* for performing communication by Bluetooth (registered trademark), and a mobile body communication circuit 310*c* for performing communication by a wide area network such as a telephone line network, together with other device. In the present embodiment, communication with the external terminal device 7 is performed by the BT communication circuit 310*b*. However, the external communication circuit 310 does not necessarily have to be equipped with the plurality of methods described above, and may have a configuration of other methods such as communication using a wired connection method, for example.

The peripheral devices 4 are assumed to include, for example, a center display 4*a*, a meter display 4*b*, a head-up display 4*c*, a speaker 4*d*, a camera 4*e*, a position detector 4*f*, a tuner 4*g*, a DSM 4*h*, a LiDAR 4*i* and the like. However, the types and numbers of the peripheral devices 4 shown in FIG. 1 are only examples, and the vehicular device 2 does not necessarily have to be connected to all of them, and other peripheral devices 4 not illustrated may also be connected.

The center display 4*a* is arranged, for example, in front of a position between the driver's seat and the passenger's seat. The center display 4*a* is used, for example, as a display screen when performing a navigation function or as an operation screen when using a touch panel (not shown) provided corresponding to a display area. That is, the center display 4*a* also functions as an input unit for inputting user's operations.

However, as the input unit, other than the touch panel, for example, mechanical operation switches (not shown) may also be arranged around the screen to input operations. Further, as the input unit, other displays or steering switches (not shown) may also be adopted, or they can be used together with the touch panel or operation switches.

The meter display 4*b* is arranged in front of a steering wheel, and displays a meter such as speed and number of rotation, and displays other things such as a warning light. The head-up display 4*c* displays various types of information on a windshield placed in front of the driver or on a display board arranged on the dashboard.

The speaker 4*d* is installed inside the vehicle, and outputs sound based on audio data output from the vehicular device 2 or the external device 3. The speaker 4*d* is used, for example, for providing warning, operation guidance, or playing music, from the vehicular device 2 or from the external device 3. Also, the speaker 4*d* can be used to output sound from the external terminal device 7.

The position detector 4*f* is composed of a GPS receiver and a gyro sensor (not shown), and acquires a current position and an orientation of the vehicle. Note that GPS is an abbreviation for Global Positioning System. The GPS receiver receives GPS positioning signals transmitted from GPS satellites, and outputs the received GPS positioning signals, and the gyro sensor detects an angular velocity of rotation about each of the X axis, Y axis, and Z axis mutually orthogonal.

The camera 4*e* is attached to a back side of the vehicle, for example, and continuously photographs the situation behind the vehicle. The image captured by the camera 4*e* is displayed on the center display 4*a* or other displays together with, for example, detection results of objects present in the image and guidance lines for guiding the vehicle. The tuner 4*g* receives radio broadcast signals of AM broadcast and FM broadcast. Also, a tuner for receiving television broadcasting may also be provided as the tuner 4*g*.

The DSM 4*h* is a driver status monitor that includes an imaging device and the like, and detects the driver's state by image analysis of a face image by photographing the driver's face. DSM is an abbreviation for Driver Status Monitor. The LiDAR 4*i* detects the positions of objects existing around the vehicle by transmitting and receiving laser light. Note that LIDAR is an abbreviation for Light Detection and Ranging.

The ECU 6 is an electronic device mounted on the vehicle. A general vehicle is equipped with a plurality of ECUs 6, and the vehicular device 2 acquires various information about the vehicle from these ECUs 6, such as the drive state of drive units such as an engine, a motor, and the like, the open/close state of doors, and the like. Although one ECU 6 is shown in FIG. 1 for simplification of explanation, the vehicular device 2 is communicably connected to a plurality of ECUs 6 via the in-vehicle network 6*a*.

The ECU 6 includes an ECU control unit 601 that performs functions implemented thereon, and an external input/output circuit 602 for communicating with devices such as the vehicular device 2, another ECU 6, or an in-vehicle device 10 such as a sensor connected to itself or the like. The ECU control unit 601 includes a CPU 604, a ROM 605, a RAM 606 and an input/output port 607, which are connected by a bus 609. Although the external input/output circuit 602 is shown as one block in FIG. 1 for simplification of explanation, it can be composed of a plurality of circuits corresponding to the devices to be connected.

The CPU 604 controls the ECU 6 by executing programs stored in the ROM 605, while providing communication with the vehicular device 2 and various functions implemented therein. This CPU 604 may be composed of one or more semiconductor devices. The ROM 605 stores programs to be executed by the CPU 604 and data to be referred to when the programs are executed. The ROM 605 constitutes an ECU side storage unit provided in the ECU 6.

The input/output port 607 is a circuit for inputting/outputting signals between the ECU control unit 601 and other devices. In the present embodiment, as other devices, the vehicular device 2, the external device 3 connected to the vehicular device 2, the external terminal device 7 connected to the external device 3, and the like are assumed. The ECU 6 can transmit and receive data in response to a request from a vehicular device 2 side.

The external terminal device 7 is assumed to be, for example, a so-called smart phone, a tablet terminal or the like. However, as will be described later, the external device 3 can be taken out of the vehicle for use. In such case, a personal computer may also be assumed as the external terminal device 7.

Figure 2:
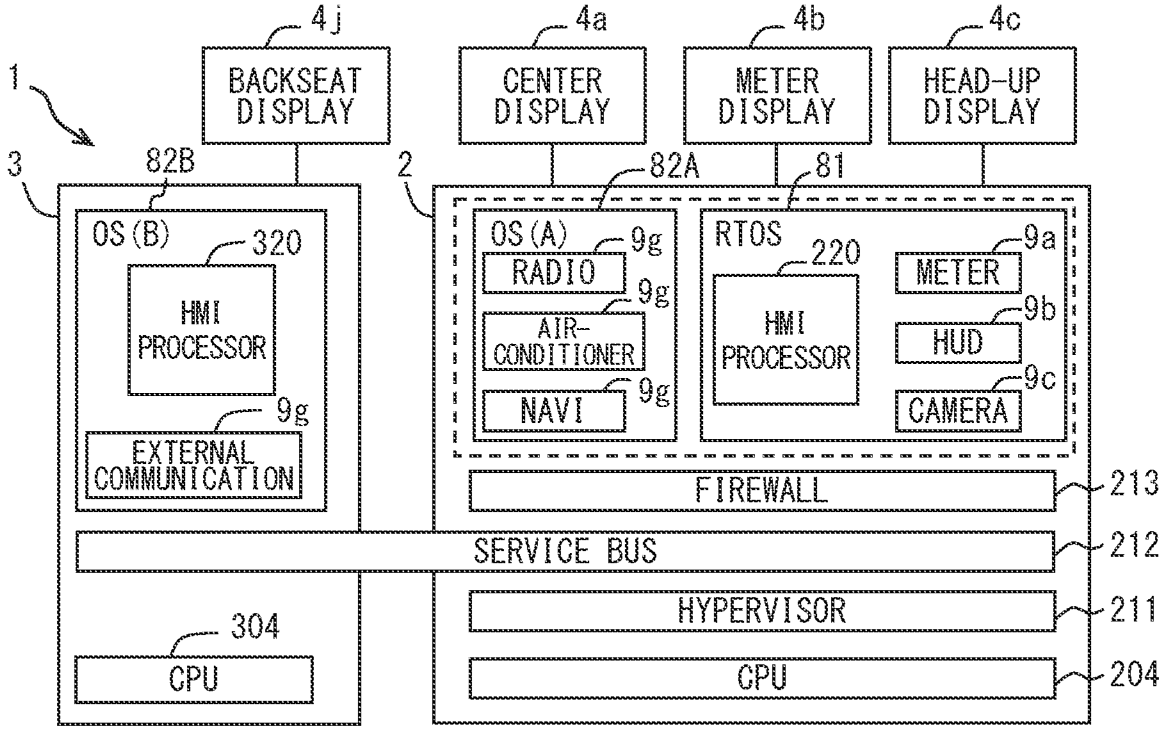
FIG. 2 is a diagram schematically showing a configuration example of software of the vehicle system.

Next, a basic software configuration of the vehicle system 1 will be described. As shown in FIG. 2, in the vehicle system 1, an operating system is installed in the vehicular device 2 and the external device 3, respectively. Hereinafter, the operating system will be referred to as OS 8. Note that OS is an abbreviation for Operating System. Also, in FIG. 2, some peripheral devices 4 are not shown for simplification of explanation, and some of the applications 9 that realize the functions that can be provided respectively by OS 8 are extracted and exemplified. However, the applications 9 included in the vehicular device 2 and the external device 3 are not limited to those shown in FIG. 2. Hereinafter, the application 9 may also be simply referred to as an application.

The vehicular device 2 includes, implemented on the control unit 201, a hypervisor 211, a service bus 212, a firewall 213, an RTOS 81 and an MMOS 82A. Note that RTOS is an abbreviation for Real Time OS, and MMOS is an abbreviation for Multi Media OS.

That is, in a case of the present embodiment, a virtual environment in which a plurality of OSs 8 can operate is built in the vehicular device 2. However, in the present embodiment, since the MMOS 82 is implemented respectively on the vehicular device 2 and the external device 3, the MMOS 82 implemented on the vehicular device 2 is denoted by 82A and the MMOS 82 implemented on the external device 3 is denoted by 82B in the following, in order to make it easier to distinguish the two. Also, when describing items common to the RTOS 81 and the MMOS 82, such items may simply and collectively be referred to as the OS 8. Further, when describing items common to the MMOS 82A and the MMOS 82B, such items may simply be referred to as the MMOS 82.

The hypervisor 211 is a general technology, so a detailed explanation is omitted, but it is a program for enabling multiple OSs 8 such as the RTOS 81 and the MMOS 82A to be executed in parallel on the control unit 201, thereby implementing a function to manage each of the OSs 8 and a function to assist communication among the OSs 8. However, the hypervisor 211 may also be implemented as part of the functions of the RTOS 81, for example.

The service bus 212 is a program for exchanging data between an application layer of the OS 8 and a lower layer indicating any layer below it. The service bus 212 includes a database for matching/associating data used in the lower layer(s) with data used in the application layer, allowing data exchange between the vehicular device 2 and the external device 3 as if they were one device.

Further, the service bus 212 converts the data format between the application layer and the lower layer by referring to the database, enabling data exchange between the RTOS 81 and the MMOS 82A within the vehicular device 2, and between the vehicular device 2 and the external device 3.

The firewall 213 includes a function of restricting unauthorized access among the OSs 8 and unauthorized access to the RTOS 81 and MMOS 82A from the outside. It should be noted that whether or not to implement the firewall 213 may be selected as appropriate, and if security can be ensured by other method, the firewall 213 may be not implemented.

The RTOS 81 is suitable for performing processes that require real-timeness, and mainly executes processes related to vehicle control, safety and the like. An HMI processor 220 is implemented on the RTOS 81. The HMI processor 220 executes processing related to display control on the center display 4*a*, the meter display 4*b*, or the head-up display 4*c* based on data input from the peripheral devices 4 or other applications 9. The HMI processor 220 also executes processing such as generation of image data utilizing a GPU (not shown) in accordance with instructions from the application 9, commands for image generation, and the like. Note that HMI is an abbreviation for Human Machine Interface, and GPU is an abbreviation for Graphics Processing Unit.

Further, the RTOS 81 executes various processing such as a display output process, an audio output process and the like. Therefore, the RTOS 81 includes, as applications 9, a meter application 9*a*, an HUD application 9*b*, a camera application 9*c*, and the like, respectively providing required function(s). Note that HUD is an abbreviation for Head-Up Display.

The meter application 9*a* performs an instruction to generate an image such as a speedometer or a warning light to be displayed on the meter display 4*b*, or performs calculations to generate a required image. In other words, the meter application 9*a* of the present embodiment does not directly access the meter display 4*b*, but rather causes the HMI processor 220 to display an image on the meter display 4*b*.

The HUD application 9*b* implements a function for controlling display on the head-up display 4*c*. The HUD application 9*b* is configured to issue instructions for generating images and to perform calculations for generating required images, thereby leaving processing for image display on the head-up display 4*c* to the HMI processor 220.

The camera application 9*c* is for realizing a function of controlling the display of the image captured by the camera 4*e*, and performs processing such as detecting an object existing in the image, calculating a guidance line when the vehicle backs up, and the like. The camera application 9*c* is used to issue instructions for generating images and to perform calculations for generating required images, thereby leaving processing for image display on the center display 4*a* and for synthesizing the captured image and the guidance line to the HMI processor 220.

The MMOS 82A is a general-purpose operating system that is used in, for example, a general external terminal device 7, and is suitable for performing multimedia processing. In the present embodiment, Android (registered trademark) is adopted as the MMOS 82. Also, the MMOS 82A2 and MMOS 82B are assumed to be of the same version or sufficiently compatible versions.

The MMOS 82A includes, for example, a radio application 9*d*, an air-conditioner application 9*e*, a navigation application 9*f*, and the like implemented thereon, for providing respective functions. The radio application 9*d* outputs sound to the speaker 4*d* based on radio broadcast signals and television broadcast signals received by the tuner 4*g*. The air-conditioner application 9*e* controls an air-conditioner provided in the vehicle. The navigation application 9*f* provides a so-called navigation function by displaying a current location of the vehicle and performing calculations for guiding a path from the current location to a destination based on the position information detected by the position detector 4*f* and the like.

These functions implemented in the vehicular device 2 in the present embodiment are functions that are used even if the product is changed. In other words, the vehicular device 2 is mainly equipped with common functions regardless of the type of the product. However, the types and number of functions illustrated here are examples only, and the functions implemented in the vehicular device 2 are not limited to the above.

On the other hand, an HMI processor 320 and an external communication application 9*g* are implemented on the MMOS 82B of the external device 3. The HMI processor 320 performs processing related to display control, like the HMI processor 220 of the vehicular device 2. At this time, the HMI processor 320 executes processing related to display on a backseat display 4*j*, which is one of the peripheral devices 4 connected to the external device 3. Further, the external communication application 9*g* executes processing related to communication with the external terminal device 7. That is, the vehicle system 1 is equipped with functions that are not provided in the vehicular device 2, in other words, functions that differ depending on the type of product. However, the types and number of functions illustrated here are examples only, and the functions implemented in the external device 3 are not limited to the above.

Figure 3:
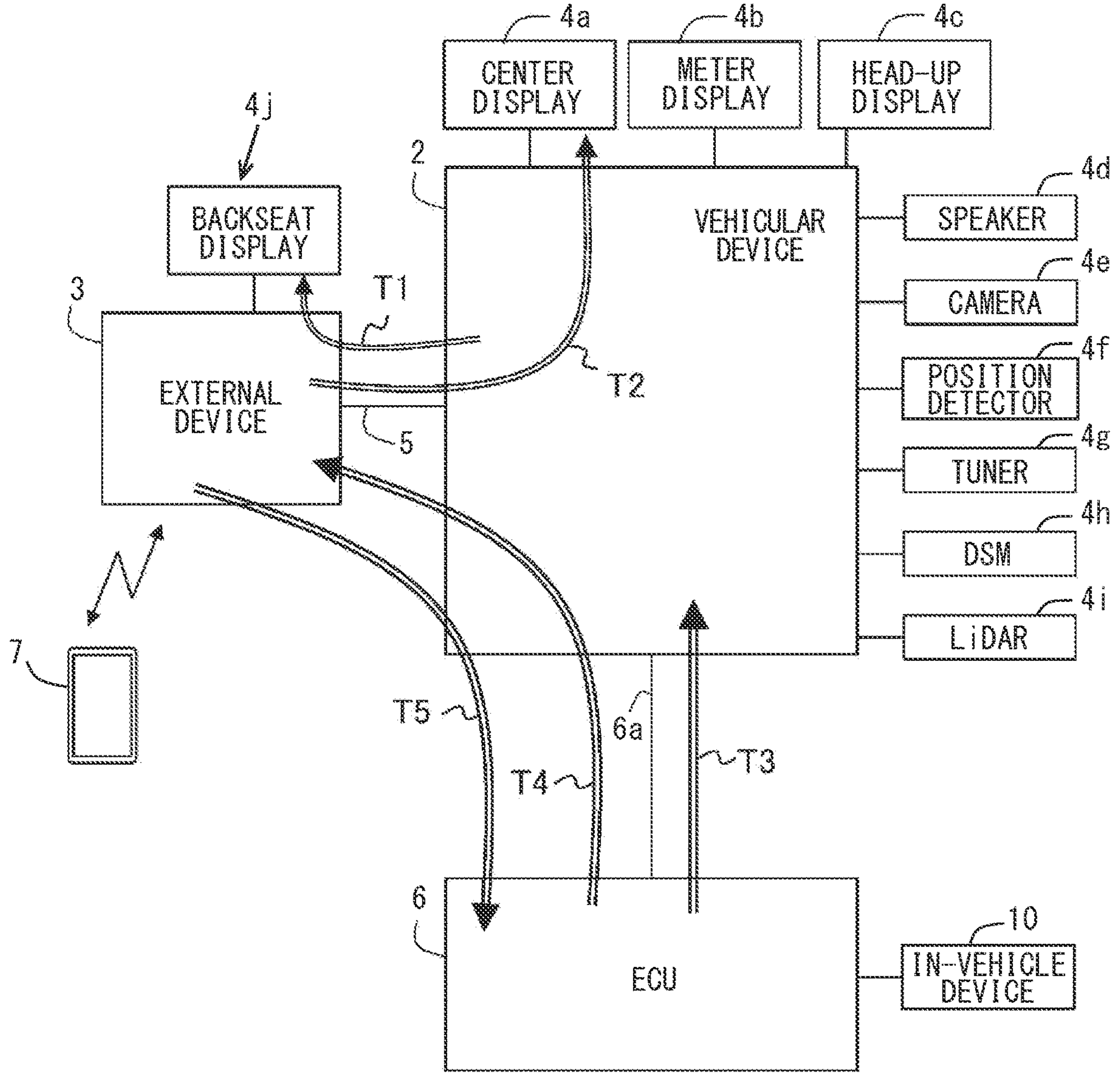
FIG. 3 is a diagram schematically showing a path through which data is transmitted and received.

Next, the operation and advantageous effects of the above configuration will be described. First, the vehicle system 1 is configured to allow communication between devices as described above. For example, as indicated by an arrow T1 in FIG. 3, the vehicle system 1 can seamlessly display information on the backseat display 4*j* from the vehicular device 2 via the external device 3. That is, in the vehicle system 1, functions implemented in the external device 3 are usable from the vehicular device 2.

Further, as indicated by an arrow T2, the vehicle system 1 can seamlessly display information from the external device 3 via the vehicular device 2 on the center display 4*a*. In other words, in the vehicle system 1, functions implemented on the vehicular device 2 are usable from the external device 3. Further, "usable from the external device 3" in the above context means that the functions are usable by the external device 3 and by the external terminal device 7.

In such case, even though data may directly be displayed on the backseat display 4*j* from the vehicular device 2 or data may directly be displayed on the center display 4*a* from the external device 3, it may also be possible to adopt a configuration in which data to be displayed is delivered to a destination device, and the destination device performs display control of the delivered data. That is, the vehicle system 1 can transfer part of the processing of the vehicular device 2 to the external device 3, or transfer part of the processing of the external device 3 to the vehicular device 2, for example.

Alternatively, the vehicle system 1 can transmit data collected from the in-vehicle device 10 by the ECU 6 to the vehicular device 2 as indicated by an arrow T3 and can use such data in the vehicular device 2, or can transmit data to the external device 3 via the vehicular device 2 as indicated by an arrow T4 and can use such data in the external device 3, or can transmit data of the external terminal device 7 to the ECU 6 via the external device 3 as indicated by an arrow T5 and can use the data in the ECU 6. That is, the vehicle system 1 is capable of using the functions implemented in the ECU 6 from the external device 3 via the vehicular device 2, and allows the ECU 6 to use the functions implemented in the vehicle system 1 itself.

So far, one form of use of the vehicle system 1 has been described, but as described above, the functions required for the vehicle system 1 may vary depending on the types of product. For example, even if the vehicular devices 2 are of the same product group and are made by the same manufacturer, there are cases where, for example, relatively expensive products have more number and types of functions than those of the inexpensive products. Further, it is assumed that the vehicular device 2 requires different hardware configuration and software configuration depending on the type and number of the peripheral devices 4 mounted on the vehicle.

Further, a plurality of types of vehicular devices 2 have been individually developed and designed according to their specifications and required hardware and software configurations in the past. However, in that case, it is required to develop hardware and software for each of many types of vehicular device 2, requiring a great deal of resources in terms of cost and manpower. Further, even if extensibility is provided in advance, the addition or expansion of functions after shipment requires work by dealers or manufacturers. Furthermore, preparing high-performance hardware in advance in anticipation of future expandability is not preferable mainly in terms of cost.

Therefore, the vehicle system 1 is devised to be easily developable, designable with reduced number of resources for accommodating products with different requirement of functions, and is devised to be easily expandable in terms of number of products and functions according to the target vehicle in which the vehicle system 1 is installed.

Figure 4:
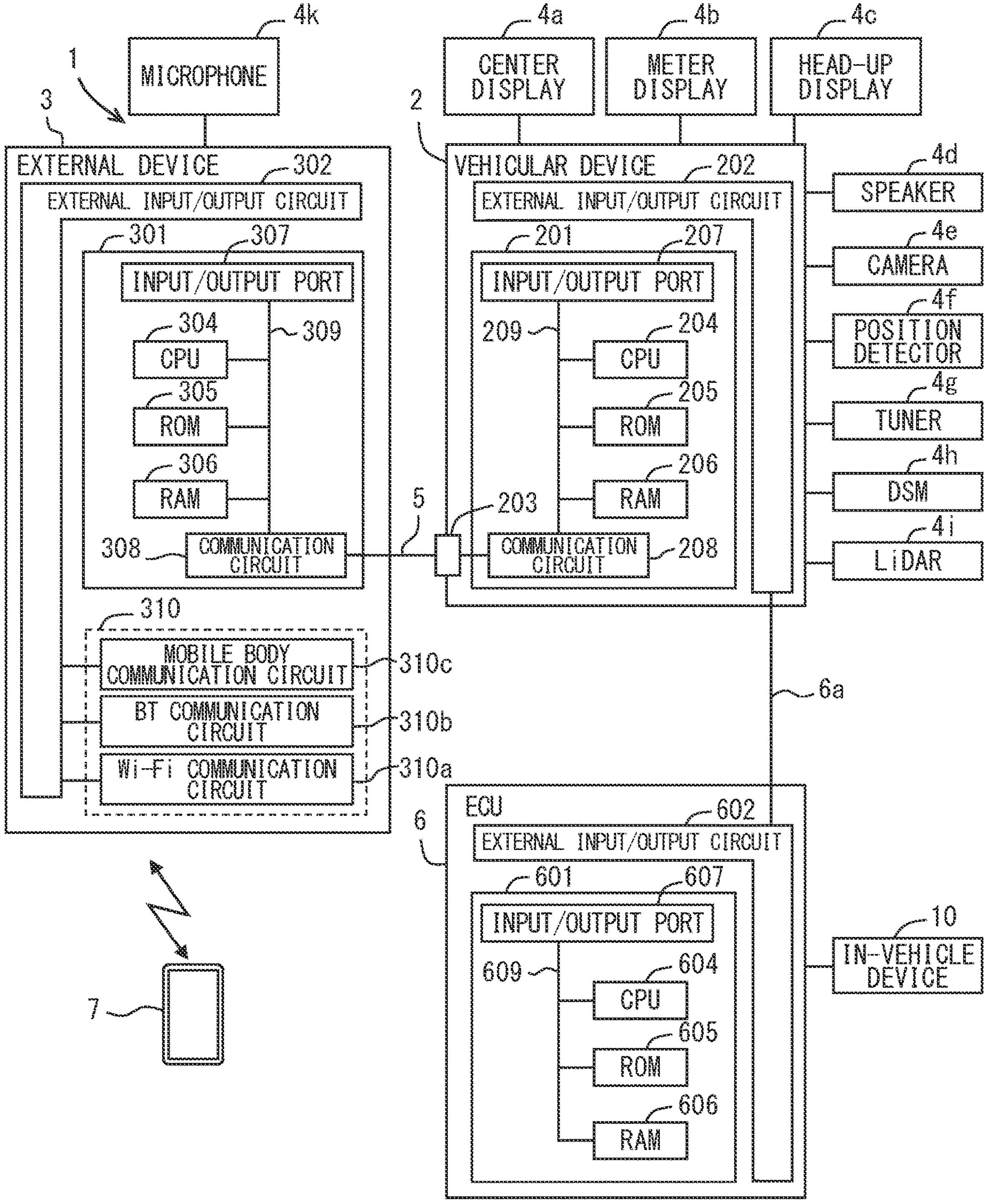
FIG. 4 is a diagram schematically showing another configuration example of hardware of the vehicle system.
Figure 5:
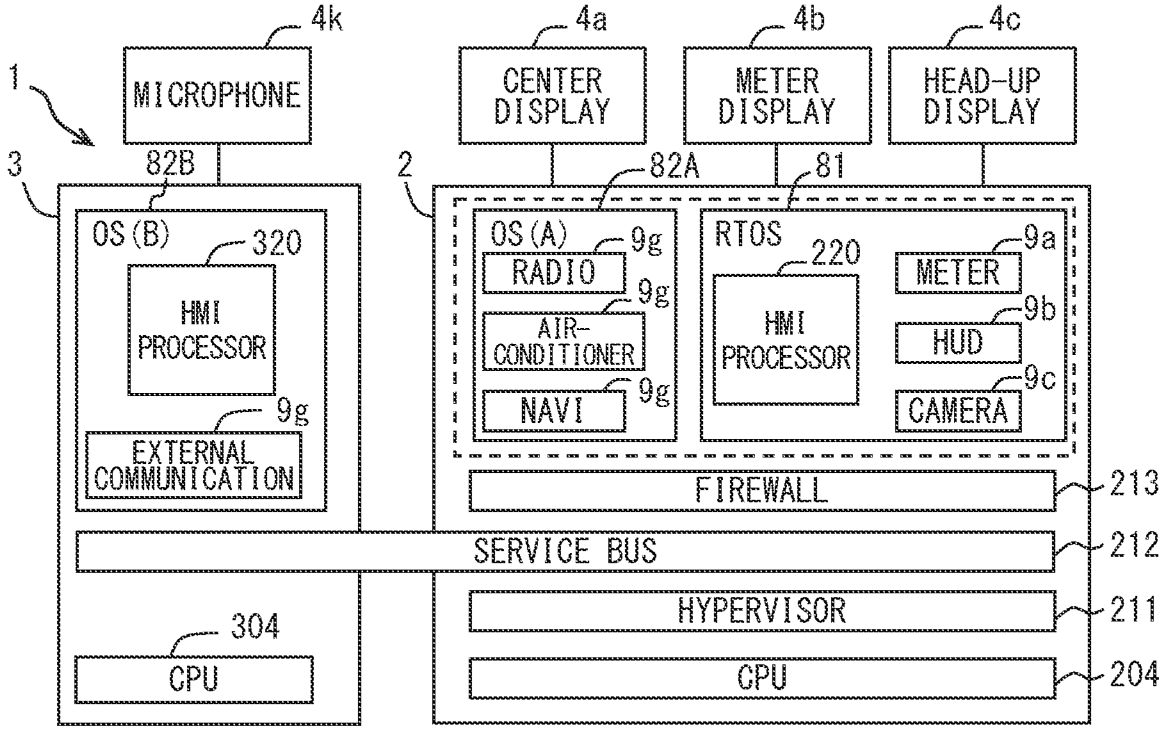
FIG. 5 is a diagram schematically showing another configuration example of software of the vehicle system.

First, as described above, FIG. 1 shows one configuration example of the vehicle system 1, and is assumed to be used in a vehicle having a backseat display 4*j*. FIG. 4 then shows another configuration example of the vehicle system 1 when used in a vehicle that does not have a backseat display 4*j* but has a microphone 4*k* for inputting voice. FIG. 5 further shows a software configuration example of the vehicle system 1 shown in FIG. 4.

As can be seen by comparing the configuration example of FIG. 1 and the configuration example of FIG. 4 regarding the vehicle system 1, the hardware configuration of the vehicular device 2 is common regardless of whether the peripheral device 4 connected to the external device 3 is the backseat display 4*j* or the microphone 4*k*. Further, as is clear from comparing the configuration example of FIG. 2 and the configuration example of FIG. 5, the software configuration of the vehicular device 2 is common regardless of whether the peripheral device 4 connected to the external device 3 is the backseat display 4*j* or the microphone 4*k*. Note that, in FIG. 5, it is assumed that the HMI processor 320 executes processing related to voice input, but the application 9 for voice processing can also be implemented.

That is, in the vehicle system 1, the vehicular device 2 can basically have the same hardware configuration and the same software configuration even if the types and numbers of the peripheral devices 4 are different. As a result, the vehicular device 2 can be developed and designed using or targeting the same hardware. Then, the external device 3 has a different software configuration depending on, for example, the peripheral devices 4 mounted on the vehicle. Note that the hardware configuration of the external device 3 can be changed according to the type and number of the peripheral devices 4.

That is, in the vehicle system 1, the functions common among the different product types are implemented in the vehicular device 2, and the functions different depending on the product type are implemented in the external device 3. In such manner, the vehicular device 2 is developable and designable with a configuration that provides common functions, that is, can be developed and designed using or targeting common hardware regardless of the type of product.

Then, the vehicular device 2 and the external device 3 are connected by a USB cable in the present embodiment. Therefore, the vehicular device 2 and the external device 3 are easily connectable. In other words, different functions are easily addable to and/or extendable in the vehicular device 2 depending on the type of product. Further, even when adding or expanding functions after shipment, the work of adding and expanding the functions is easy.

Therefore, it is possible to provide the vehicle system 1 that is developable and designable with reduced number of resources even for products with different functions, and that has the ease of expanding the functions.

Further, in the vehicle system 1, the vehicular device 2 can use the functions implemented in the external device 3. In such manner, functions that are not provided in the vehicular device 2 can be seamlessly controlled by the vehicular device 2, i.e., under control of the vehicular device 2.

Further, in the vehicle system 1, the functions implemented in the vehicular device 2 can be used from the external device 3. In such manner, functions that are not provided in the external device 3 can be seamlessly controlled by the external device 3, i.e., under control of the external device 3.

Further, in the vehicle system 1, the functions implemented in the ECU 6 are usable from the external device 3 via the vehicular device 2, and allow the ECU 6 to use the functions implemented in the vehicle system 1. In such manner, the resources of each of the devices in the vehicle system 1 are effectively utilizable.

Figure 6:
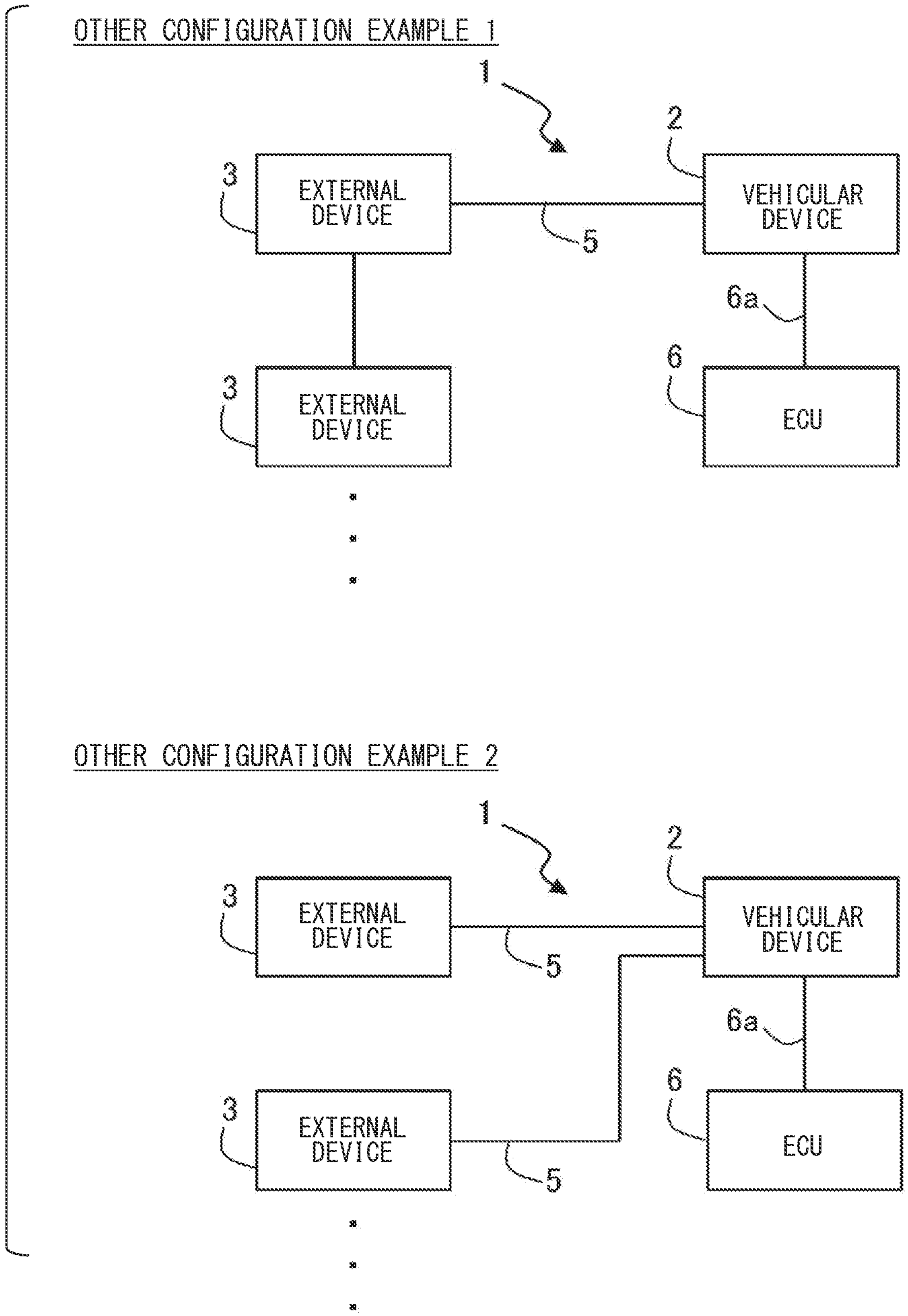
FIG. 6 is a diagram schematically showing another connection example of the vehicle system.

Further, in the vehicle system 1, the vehicular device 2 and a plurality of external devices 3 are connectable, as shown in FIG. 6. In such case, as shown as another configuration example 1 in FIG. 6, the vehicle system 1 is configurable to have a plurality of external devices 3 in a daisy-chain method, connecting the external device 3 being connected to the vehicular device 2 is further connectable to the other external device(s) 3. In such case, the functions can be easily expanded by connecting the external devices 3 with, for example, a USB cable.

Alternatively, the vehicle system 1 may also have a configuration in which a plurality of external devices 3 are connected to the vehicular device 2, as shown as another configuration example 2. In such case, for example, by providing a plurality of USB ports in the vehicular device 2 and connecting each of the external devices 3 with a USB cable, the function can be easily expanded. Also, the connection with the vehicular device 2 and the connection between the external devices 3 can be established by other wired methods or wireless methods. At this time, the functions can be expanded more easily by connecting with a wireless communication method.

Further, it can be configured to implement, in the external device 3, the function(s) (a) that is/are expected to be updated after shipment of the product, or (b) that is/are expected to be relatively frequently updated than the functions implemented in the vehicular device 2. In such case, both of the OS 8 and the application 9 are included as functions. For example, the Android OS, which is used as the OS 8 on the external device 3 in the present embodiment, is considered to be updated with a much higher frequency than the product life of the vehicular device 2. Further, when the version of the OS 8 is upgraded, the application 9 may also need to be updated, and when the application 9 is to be upgraded, the OS 8 may also need to be updated.

Therefore, by concentrating/aggregating these functions in the external device 3, it is possible to update the OS 8 and the application 9 even after the product is shipped. Further, it becomes possible to update the external device 3 itself, and the work of updating is easily performable. Further, since the vehicular device 2 basically does not need to be updated, it is possible to prevent the vehicular device 2, which is assumed to be in charge of processing related to safety, for example, from being affected.

Also, although an example in which the hypervisor 211 is implemented independently from each of the OSs 8 and each of the OSs 8 is operated on the hypervisor 211 has been shown, other configurations are also possible. For example, if the RTOS 81 has a hypervisor 211 function, the RTOS 81 may be activated first to enable the hypervisor 211 function, and then the MMOS 82A may be executed on the RTOS 81.

Although a software configuration example in which multiple OSs 8 are implemented in the vehicular device 2 and one OS 8 is implemented in the external device 3, other software configurations are also possible. For example, one RTOS 81 may be implemented in the vehicular device 2 and multiple OSs 8 may be implemented in the external device 3.

Second Embodiment

Next, the second embodiment will be described. In the second embodiment, a specific utilization form of the vehicle system 1, and an example in which mainly the data in the external device 3 is used in the vehicular device 2 will be described. Further, since the basic hardware and software configurations of the vehicle system 1 are generally the same as those of the first embodiment except for a part of the configuration of the external device 3, the description also refers to FIGS. 1 to 6 as well.

When the vehicle is in a non-operating state with no passengers or operators boarded thereon, a power supply from a main power supply to the vehicular device 2 is turned off. Therefore, when obtaining (a) the data used by the vehicular device 2 for setting the destination during navigation, or (b) the data for control or data for control-related operation such as the vehicle speed, a remaining amount of fuel, and the state of the battery acquired from the ECU 6, the user used to be required to actually get on the vehicle and to turn on the engine key or to operate a start switch, for operating the vehicular device 2.

In other words, it is basically required for an operator or a driver to approach and operate the vehicular device 2 in order to make some settings on the vehicular device 2 or to receive some data from a vehicular device 2 side. Note that data settings to a vehicular device 2 side and data retrieval from a vehicular device 2 side mean that data setting and data retrieval are performed to or from the vehicular device 2 as well as to or from the peripheral devices 4 and the ECU 6 connected to the vehicular device 2.

Therefore, the vehicle system 1 of the present embodiment enables making settings and delivering of data to and from a vehicular device 2 side in advance or remotely, without having any occupant onboard. Specifically, as described in the first embodiment, the external device 3 of the vehicle system 1 can transmit and receive data to and from the external terminal device 7 by being communicably connected to the external terminal device 7. Further, the vehicular device 2, the external device 3, and the ECU 6, which constitute the vehicle system 1, are mutually communicably connected to each other, so that data can be transmitted and received just like the above.

Further, in the present embodiment, the external communication application **9*g* installed in the external device 3 performs processing related to communication with the external terminal device 7, while receiving data to be delivered from the external terminal device 7 to the vehicular device 2, to the peripheral devices 4, or to the ECU 6, and performing processing for delivering the received data to the vehicular device 2, to the peripheral devices 4 or to the ECU 6**.

In other words, the external device 3 is configured to be accessible from the external terminal device 7, and data resulting from such access, for example, are reflected on the vehicular device 2, the peripheral devices 4, or the ECU 6. At such time, the data to be delivered are assumed as including (a) destination data to be searched by the external terminal device 7 and used by the navigation application **9*f* in the vehicular device 2, (b) music data stored in the external terminal device 7 and output from the speaker 4*d* which is one of the peripheral devices 4, and/or (c) data regarding a seat position to be transmitted to the ECU 6**, which is an electronic control unit, in order to change the seat position and seat inclination according to the user preference, for example. However, the types and number of data to be delivered are not necessarily limited to the above.

Figure 7:
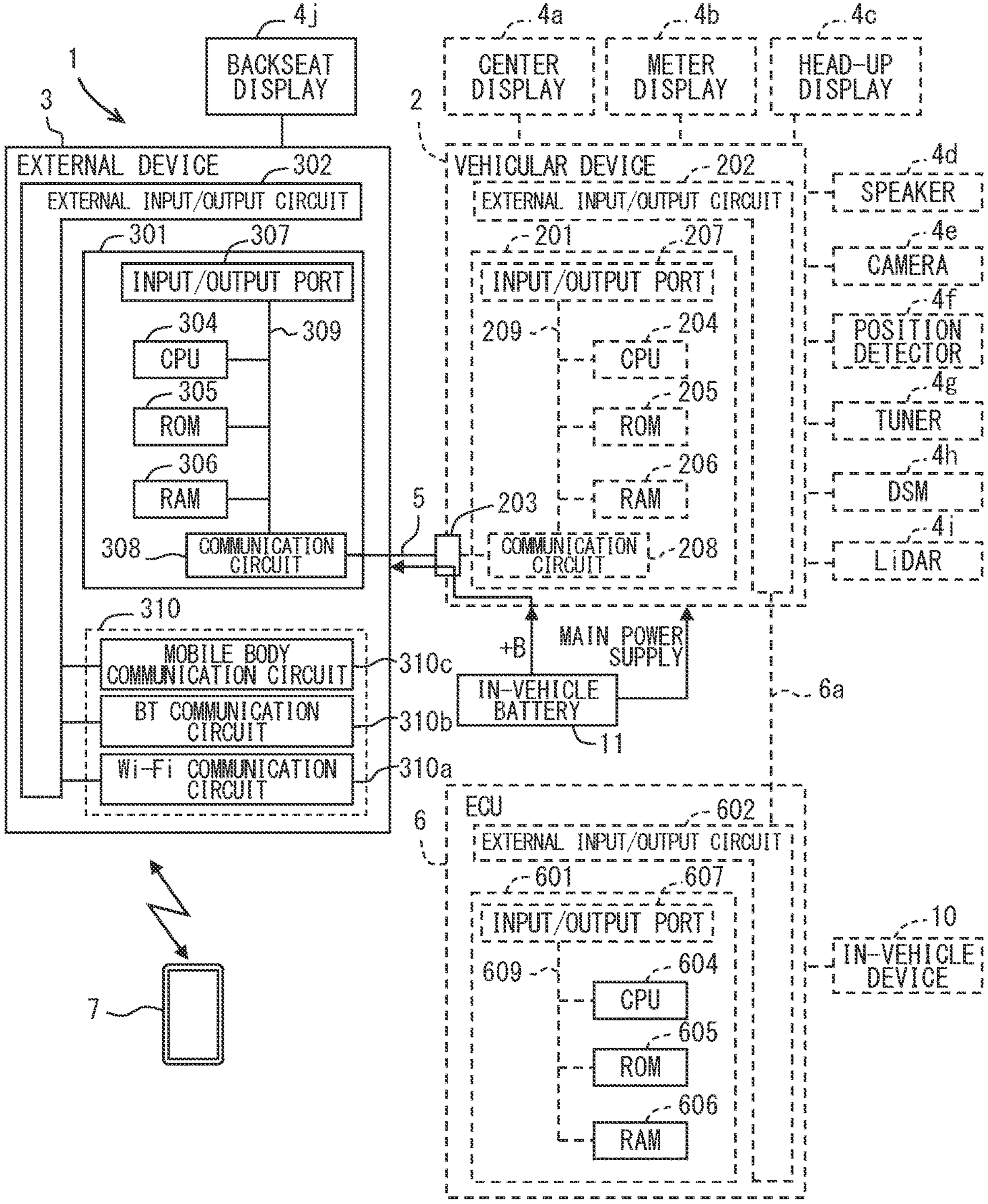
FIG. 7 is a diagram schematically showing a configuration example of the vehicle system according to a second embodiment.

At such time, as shown in FIG. 7, the external device 3 is configured to receive a backup power supply from an in-vehicle battery 11 installed on the vehicle via the vehicular device 2. Note that, in FIG. 7, the backup power supply is shown as +B. In such case, electric power can be supplied by using the communication line 5 with a cable capable of supplying electric power.

Figure 8:
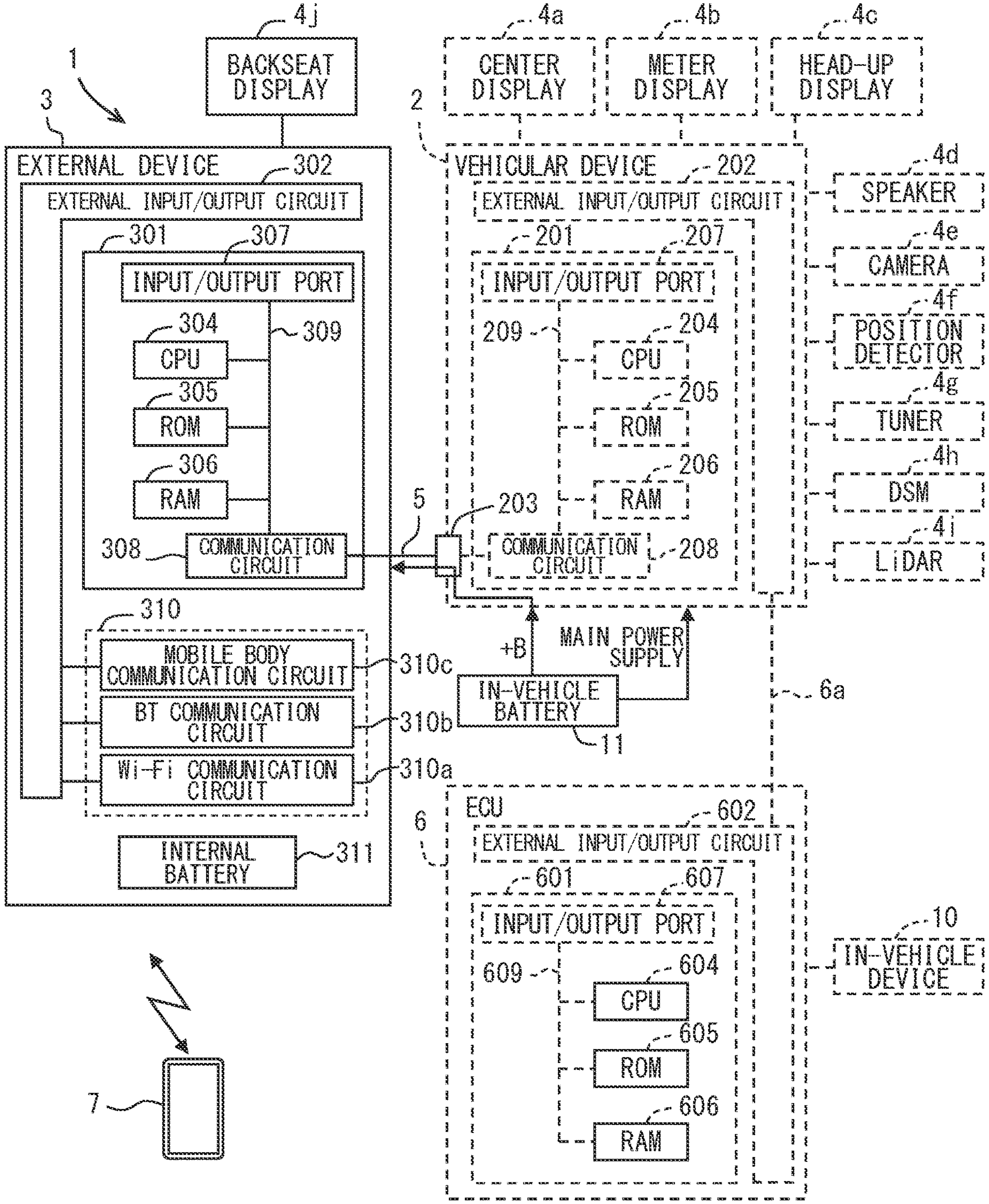
FIG. 8 is a diagram schematically showing yet another configuration example of hardware of the vehicle system.

Alternatively, as shown in FIG. 8, the external device 3 is configured to be independently operable without being physically connected to the vehicular device 2, by receiving supply of electric power from a built-in internal battery 311. In such case, it becomes possible to take the external device 3 to an outside of the vehicle. Note that FIG. 8 schematically shows that the external device 3 is not connected to the vehicular device 2 by drawing the vehicular device 2 with a broken line.

Further, a configuration in FIG. 8 shows that (a) electric power is supplied from the backup power supply when the external device 3 is connected to the vehicular device 2, and (b) electric power is supplied from the internal battery 311 when the external device 3 is disconnected from the vehicular device 2. A configuration using both of the in-vehicle battery 11 and the internal battery 311 will be described below as an example. However, the external device 3 may be configured to receive supply of electric power from at least one of the in-vehicle battery 11 and the internal battery 311. Also, the external device 3 may be configured to receive supply of electric power from other device such as the external terminal device 7 to which a USB cable is connected, instead of receiving supply of electric power from the in-vehicle battery 11.

In such case, if power consumption is suppressed by using the BT communication circuit 310*b* for communication with the external terminal device 7, even if backup electric power is supplied from the in-vehicle battery 11, for example, communication with a smartphone outside the vehicle can be established. Note that, in FIG. 7, by drawing the vehicular device 2 with a broken line, it is schematically shown that the vehicular device 2 is in a non-operating state.

The vehicle system 1 having such a configuration can communicate with the external terminal device 7 even when the vehicle is in a stopped state, allowing, for example, the external terminal device 7 outside the vehicle to set a destination. In such manner of access from the external terminal device 7, for example, data for setting and control are stored in a writable area of the ROM 305 of the external device 3.

At such time, the external device 3 can be operated by using the external terminal device 7. Thereby, operability is improvable due to setting operation or the like by using a smartphone, for example, instead of using the vehicular device 2 which typically has different menu display and the like maker to maker, with which the user needs to have already accustomed for smooth operation.

Figure 9:
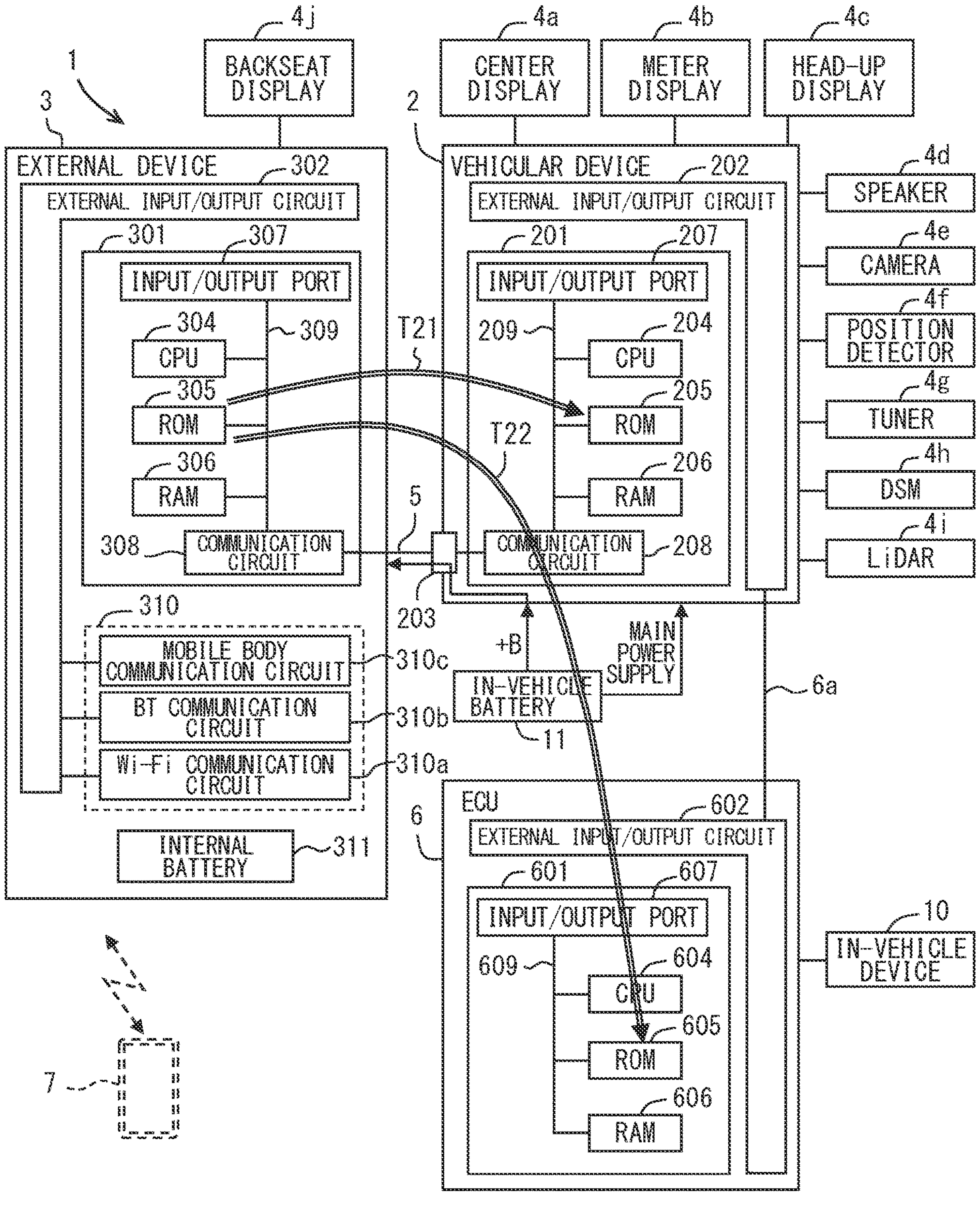
FIG. 9 is a diagram schematically showing another path through which data is transmitted and received.

Further, when the vehicle system 1 is connected to the vehicular device 2 as shown in FIG. 9, stored data that is a result of access from the external terminal device 7 is transmitted to, or is reflected on, the vehicular device 2 as indicated by an arrow T21 or the ECU 6 as indicated by an arrow T22. Note that FIG. 9 schematically shows, by drawing the external terminal device 7 with a broken line, that the external terminal device 7 is unrequired when the access result is reflected.

By adopting such a configuration, in the vehicle system 1, setting for the vehicular device 2 and the like are performable at a time before boarding the vehicle and remotely, without requiring the user to be near the vehicular device 2. Further, since remote operation is enabled, for example, it is possible to perform settings by a person who is different from the person who actually gets on board.

As described above, the vehicle system 1 includes the vehicular device 2 and the external device 3 that is independently operable and is communicably connected to the vehicular device 2. The external device 3 is accessible from the external terminal device 7, and can reflect the result of the access on the vehicular device 2. In such manner, the vehicle system 1 can perform settings and the like in the vehicular device 2 in advance or remotely without actually getting into the vehicle or operating the vehicular device 2.

Further, in the vehicle system 1, the external device 3 is accessible from the external terminal device 7 with respect to the functions implemented in the vehicular device 2, and reflects the access result from the external terminal device 7 on the vehicular device 2. In such manner, settings can be performed without directly operating the vehicular device 2, and, even a person unfamiliar with the operation of the vehicular device 2 can easily perform the settings.

Further, in the vehicle system 1, the external device 3 can access the peripheral devices 4 connected to the vehicular device 2 from the external terminal device 7, and causes the result of access from the external terminal device 7 to be reflected on the vehicular device 2. Thus, not only the vehicular device 2 but also the peripheral devices 4 can be set from the external terminal device 7, thereby even a person unfamiliar with the operation of the vehicular device 2 can easily perform the settings.

Further, in the vehicle system 1, the external device 3 can be independently operable even when the vehicular device 2 is not operating or even when it is not connected to the vehicular device 2. Thus, even when the user is not onboard in the vehicle, or even when the user takes the device to an outside of the vehicle to a remote location, it is possible to make settings in the vehicular device 2.

Further, in the vehicle system 1, the external device 3 is communicably connected to the external terminal device 7 via a wired or wireless communication path. In such manner, easy access from the external terminal device 7 to the external device 3 is establishable.

Further, in the vehicle system 1, the external device 3 receives supply of electric power from the in-vehicle battery 11 thereby independently operable. In such manner, access from the external terminal device 7 is made possible even when the vehicular device 2 is not in operation.

Further, in the vehicle system 1, the external device 3 is independently operable by receiving supply of electric power from the internal battery 311 contained therein. In such manner, access from the external terminal device 7 is possible even when the external device 3 is not connected to the vehicular device 2 or when the external device 3 is taken to an outside of the vehicle.

Also, with regard to the vehicle system 1 of the present embodiment, different functions can be easily added and expanded depending on the type of product, and, due to the ease of connection between the vehicular device 2 and the external device 3, the same effects as in the first embodiment are achievable, such as the ability to easily add or expand functions after shipment.

Third Embodiment

The third embodiment will be described in the following. In the third embodiment, another specific utilization form of the vehicle system 1, and an example in which mainly the data in the vehicular device 2 is used in the external device 3 will be described. Also, since the configuration of the vehicle system 1 is generally the same as that of the second embodiment, FIGS. 6 to 8 will be referred to, and the basic hardware and software configurations will be described with reference to FIGS. 1 to 5.

When the vehicle is in a non-operating state with no passengers or operators onboard, a supply of electric power from a main power supply to the vehicular device 2 is turned off. Therefore, when the user would like to externally use (a) data of the monitoring result of DSM 4*h* stored in the vehicular device 2, or (b) data for control or data for control-related operation such as the vehicle speed, the remaining amount of fuel, and the state of the battery acquired from the ECU 6, the user used to be required to actually get on the vehicle and to turn on the engine key or to operate a start switch, for operating the vehicular device 2.

In other words, in order to obtain data from a vehicular device 2 side, it was basically required to operate the vehicular device 2 at a position near the vehicular device 2. Note that obtaining data from a vehicular device 2 side means that obtaining data from the vehicular device 2 as well as from the peripheral devices 4 and the ECU 6 connected to the vehicular device 2.

Therefore, in the vehicle system 1 of the present embodiment, the data acquired from a vehicular device 2 side is accessible from the external device 3 or the external terminal device 7, (a) without having any occupant onboard, and (b) without starting the vehicular device 2 on site or remotely.

Figure 10:
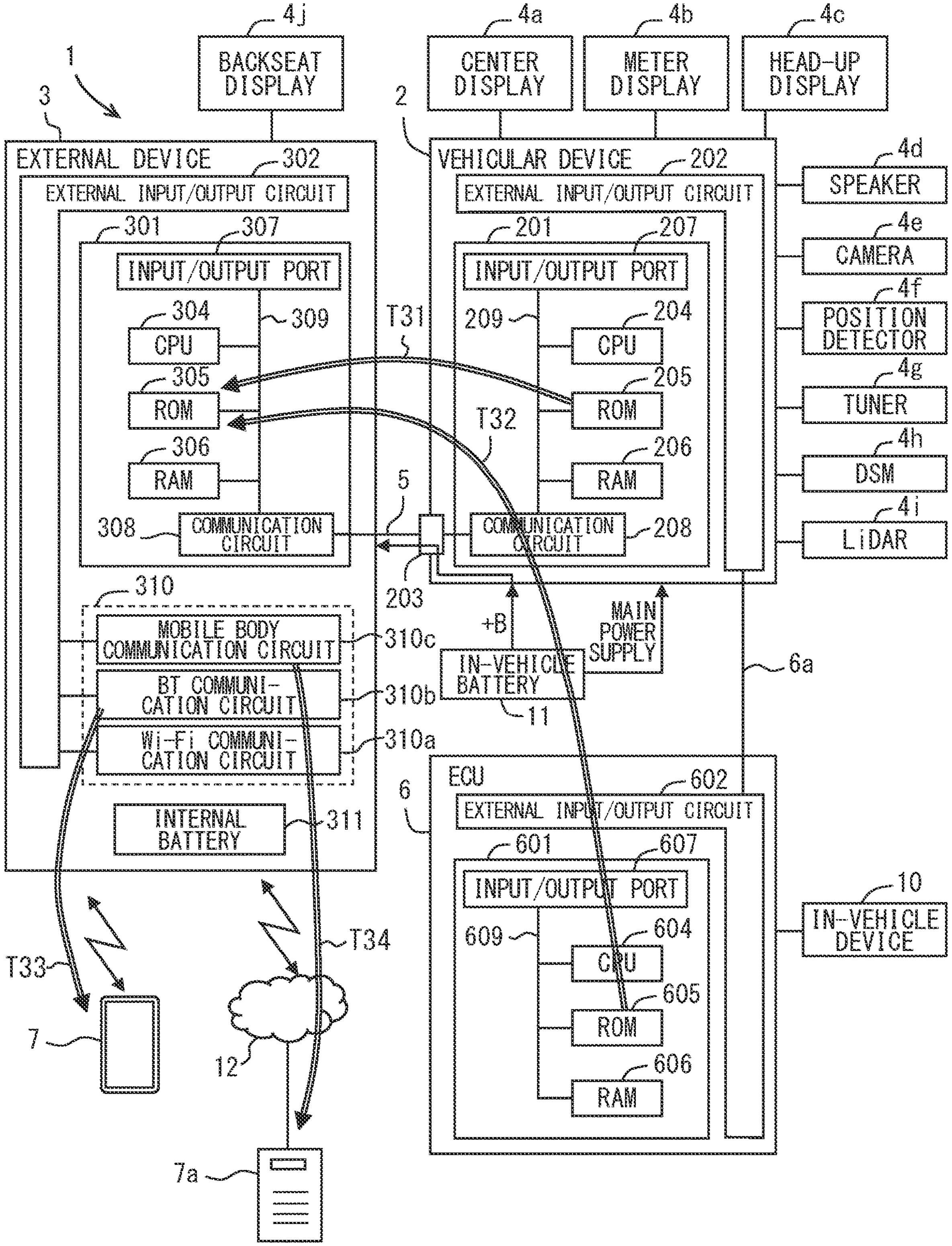
FIG. 10 is a diagram schematically showing a configuration example of the vehicle system according to a third embodiment.

In the vehicle system 1, as described in the first embodiment, the vehicular device 2, the external device 3, the peripheral devices 4, and the ECU 6 are communicably connected. Therefore, in a state in which the external device 3 is connected to the vehicular device 2 as shown in FIG. 10, data stored in the vehicular device 2 is transmittable to the external device 3 as indicated by an arrow T31, and data collected by the ECU 6 from the in-vehicle device 10, for example, is transmittable to the external device 3 as indicated by an arrow T32.

At such time, transmission of data from a vehicular device 2 side to an external device 3 side, that is, data retrieval from an external device 3 side, may be periodically performed at a predetermined cycle while the vehicular device 2 is operating, may be performed when data is changed, or when data needs to be notified to the outside such as when there is an abnormality in the travel data.

Then, the external device 3 can also transmit and receive data to and from the external terminal device 7. In other words, the external device 3 allows the external terminal device 7 to have access to the data received from a vehicular device 2 side. Therefore, as indicated by an arrow T33, data is transmittable from the external device 3 to the external terminal device 7 such as a user's smartphone by the BT communication circuit 310*b*, for example, or, as indicated by an arrow T34, data is transmittable via a wide area network 12 to an external terminal device 7*a* configured by, for example, a cloud server or storage by a mobile body communication circuit 310*c*.

At such time, if the data is retrieved via the mobile body communication circuit 310*c*, it can be performed even while the vehicle is traveling, and the state of the occupant, especially the driver, and the vehicle state can be retrieved in real time. However, the type and number of data to be retrieved by the external terminal device 7 are not limited to the above, and required data can be selected as appropriate. Further, the external terminal device 7*a* is not limited to a cloud server or storage, and may also be a mobile terminal, a personal computer, or the like owned by the user. Hereinafter, they are collectively referred to simply as the external terminal device 7.

Figure 11:
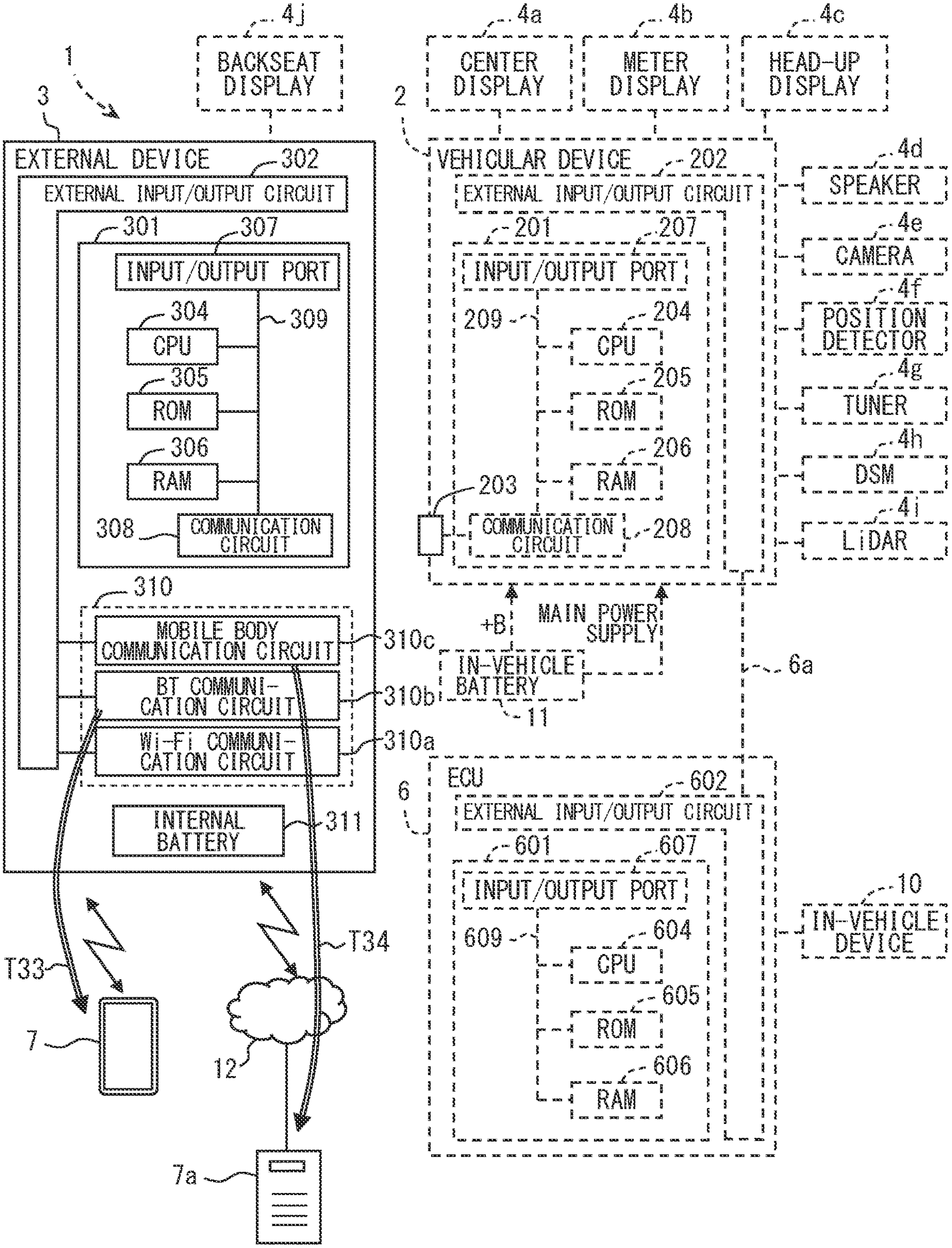
FIG. 11 is a diagram schematically showing yet another path through which data is transmitted and received.

Further, as described in the second embodiment and as shown in FIG. 11, the external device 3 can operate alone, even when the vehicular device 2 is not operating or even when disconnected from the vehicular device 2. Note that FIG. 11 schematically shows a disconnected state and a state in which the vehicular device 2 is not operating by drawing the vehicular device 2 with a broken line.

Further, via communication between the external device 3 which is independently operable and the external terminal device 7, data of the above-described various types stored in the external device 3 can be collected by the external terminal device 7 even when the vehicular device 2 is powered off, or even when the external device 3 is in a state of being taken to an outside of the vehicle. Also, data can be used by the external device 3 in itself, i.e., without transmitting the data to the external terminal device 7.

As described above, the vehicle system 1 includes the vehicular device 2 and the external device 3 that is independently operable and is communicably connected to the vehicular device 2. Further, the external device 3 receives data from a vehicular device 2 side and enables the external terminal device 7 to have access to the received data.

In such manner, the vehicle system 1 enables the external device 3 and the external terminal device 7 to have access to the data acquired from a vehicular device 2 side (a) without having any occupant onboard, and (b) without starting the vehicular device 2 on site or remotely.

Further, in the vehicle system 1, the external device 3 is independently operable even when the vehicular device 2 is not operating or even when it is not connected to the vehicular device 2. is. Thus, even when the user is not onboard in the vehicle, or even when the user takes the device to an outside of the vehicle, i.e., to a remote location, it is possible to make settings in the vehicular device 2.

Further, in the vehicle system 1, the external device 3 is communicably connected to the external terminal device 7 via a wired or wireless communication path. In such manner, easy access from the external terminal device 7 to the external device 3 is establishable.

Further, in the vehicle system 1, the external device 3 receives supply of electric power from the in-vehicle battery 11 thereby independently operable. In such manner, access from the external terminal device 7 is made possible even when the vehicular device 2 is not in operation.

Further, in the vehicle system 1, the external device 3 is independently operable by receiving supply of electric power from the internal battery 311 contained therein. In such manner, access from the external terminal device 7 is possible even when the external device 3 is not connected to the vehicular device 2 or when the external device 3 is taken to an outside of the vehicle.

Also, with regard to the vehicle system 1 of the present embodiment, different functions can be easily added and expanded depending on the type of product, and, due to the ease of connection between the vehicular device 2 and the external device 3, the same effects as in the first embodiment are achievable, such as the ability to easily add or expand functions after shipment.

Further, in combination with the second embodiment, due to the configuration of (a) the external device 3 accessible from the external terminal device 7, and (b) the result of such access reflectable on the vehicular device 2, the vehicle system 1 can achieve the same effects as in the second embodiment, e.g., enabling making settings for the vehicular device 2 in advance or from a remote location without having any occupant onboard or without operating the vehicular device 2.

While the present disclosure has been described with reference to embodiments thereof, it is to be understood that the disclosure is not limited to such embodiments and structures. The present disclosure includes various modifications and deformations within a range of equivalence. Further, various combinations and forms, with one or more element added thereto or subtracted therefrom, together with other combinations and forms are also within the sprit and the scope of the present disclosure.

The control unit and the method according to the present disclosure may be realized by a dedicated computer provided by constituting a processor and a memory programmed to execute one or more functions embodied by a computer program. Alternatively, the control unit and the method according to the present disclosure may also be realized by a dedicated computer configured as a processor with one or more dedicated hardware logic circuits. Alternatively, the control unit and the method according to the present disclosure may also be realized by using one or more dedicated computers constituted as a combination of (a) the processor and the memory programmed to execute one or more functions and (b) the processor with one or more hardware logic circuits. Further, the computer program may be stored in a computer-readable, non-transitory, tangible storage medium as instructions to be executed by the computer.

What is claimed is:

1. A vehicle system, comprising:

a vehicular device; and an external device solely operable and communicatively connected to the vehicular device, wherein the external device is configured to be accessible from an external terminal device in advance before boarding a vehicle and remotely away from the vehicular device to allow the external device to change data stored in the external device and is configured to reflect the changed data, as a result of such an access from the external terminal device in advance before boarding the vehicle and remotely away from the vehicular device, on the vehicular device, thereby asynchronously enabling in-advance and remote access from the external terminal device to the external device to transmit the changed data to the vehicular device arbitrarily at a time of connection of the external device to the vehicular device.

2. The vehicle system of claim 1, wherein the external device is accessible from the external terminal device regarding data related to a function implemented in the vehicular device, and the external device is configured to reflect the result of the access from the external terminal device on the vehicular device when the external device is connected to the vehicular device.

3. The vehicle system of claim 1, wherein the external device is accessible from the external terminal device regarding data related to a peripheral device or an electronic control device connected to the vehicular device, and the external device is configured to reflect the result of the access from the external terminal device on the vehicular device when the external device is connected to the vehicular device.

4. The vehicle system of claim 1, wherein the external device is configured to operate solely even when the vehicular device is not operating.

5. The vehicle system of claim 1, wherein the external device is configured to operate solely even when the external device is not connected to the vehicular device.

6. The vehicle system of claim 1, wherein the external device is communicatively connected to the external terminal device via a wired communication path or a wireless communication path.

7. The vehicle system of claim 1, wherein the external device is configured to solely operate by receiving electric power from an internal battery or an in-vehicle battery.

8. A vehicle system, comprising:

a vehicular device; and an external device having a communication circuit and an external communication circuit, the communication circuit solely operable and communicatively connected to the vehicular device and the external communication circuit communicatively connected to an external terminal device via a communication path that is different from a communication path used by the vehicular device;

wherein the external device is configured to be accessible from the external terminal device in advance before boarding a vehicle and remotely away from the vehicular device to allow the external device to change data stored in the external device and is configured to reflect the changed data, as a result of such an access from the external terminal device in advance before boarding the vehicle and remotely away from the vehicular device, on the vehicular device, thereby asynchronously enabling in-advance and remote access from the external terminal device to the external device to transmit the changed data to the vehicular device arbitrarily at a time of connection of the external device to the vehicular device.

* * * * *